United States Patent
Fang et al.

(10) Patent No.: US 9,992,294 B2
(45) Date of Patent: Jun. 5, 2018

(54) INFORMATION PUSH SYSTEM AND METHOD

(71) Applicant: Quanta Computer Inc., Taoyuan (TW)

(72) Inventors: Tien-Chin Fang, Taoyuan (TW);
Chen-Chung Lee, Taoyuan (TW);
Ping-Chi Lai, Taoyuan (TW);
Chia-Hung Lin, Taoyuan (TW);
Ming-Jen Chen, Taoyuan (TW);
Ching-Wen Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 266 days.

(21) Appl. No.: 14/932,222

(22) Filed: Nov. 4, 2015

(65) Prior Publication Data
US 2017/0034294 A1    Feb. 2, 2017

(30) Foreign Application Priority Data

Jul. 28, 2015   (TW) .............................. 104124336 A

(51) Int. Cl.
  *H04L 29/08*   (2006.01)
(52) U.S. Cl.
  CPC ............ *H04L 67/26* (2013.01); *H04L 67/306* (2013.01)
(58) Field of Classification Search
  CPC .................................................. H04L 67/26
  USPC ......................................................... 709/217
  See application file for complete search history.

(56) References Cited

U.S. PATENT DOCUMENTS

| | | | | |
|---|---|---|---|---|
| 5,721,833 A | * | 2/1998 | Cooperman | H04L 29/06 710/52 |
| 7,970,860 B2 | * | 6/2011 | Kline | G06F 17/30902 709/217 |
| 2006/0028488 A1 | * | 2/2006 | Gabay | H04L 29/06027 345/626 |
| 2009/0248475 A1 | * | 10/2009 | Choi | G06Q 10/107 709/219 |

(Continued)

FOREIGN PATENT DOCUMENTS

| TW | 201135487 | 10/2011 |
|---|---|---|
| TW | 201324404 | 6/2013 |

OTHER PUBLICATIONS

Dubas et al., "Webcasting/Push Technology on Intranets and Extranets", 2004.*

(Continued)

*Primary Examiner* — O. C. Vostal
(74) *Attorney, Agent, or Firm* — McClure, Qualey & Rodack, LLP

(57) ABSTRACT

An information push system, including a plurality of signal transmitters, a client side, and a server. The signal transmitters are configured to output a respective identification code. The client side is configured to determine a user setting, and receive the identification codes from the signal transmitters. The server is configured to receive the user setting and the identification codes from the client side, and output the push information of a received identification code according to the user setting and the received identification code. The server also includes a database, which is configured to store the user setting, and the identification code and the push information which are corresponding to each signal transmitter.

4 Claims, 4 Drawing Sheets

(56) References Cited

U.S. PATENT DOCUMENTS

| | | | |
|---|---|---|---|
| 2010/0325004 A1* | 12/2010 | Schoettle | G06Q 30/0601 |
| | | | 705/26.1 |
| 2011/0252110 A1 | 10/2011 | Wu et al. | |
| 2011/0314462 A1* | 12/2011 | Clark | G06F 8/65 |
| | | | 717/169 |
| 2012/0307656 A1* | 12/2012 | Vyrros | H04L 12/1859 |
| | | | 370/252 |
| 2013/0047034 A1* | 2/2013 | Salomon | H04W 4/00 |
| | | | 714/18 |
| 2013/0286942 A1* | 10/2013 | Bonar | H04B 7/0689 |
| | | | 370/328 |
| 2014/0019563 A1* | 1/2014 | Johnston | H04L 51/38 |
| | | | 709/206 |
| 2015/0186609 A1* | 7/2015 | Utter, II | A61B 5/0022 |
| | | | 600/301 |
| 2015/0186869 A1* | 7/2015 | Winters | G06Q 20/3255 |
| | | | 705/26.81 |
| 2015/0312915 A1* | 10/2015 | Li | H04W 24/10 |
| | | | 455/452.1 |
| 2016/0041573 A1* | 2/2016 | Chen | G06F 1/266 |
| | | | 700/295 |
| 2016/0323357 A1* | 11/2016 | Lang | G06F 17/30864 |
| 2017/0111463 A1* | 4/2017 | Maze | H04L 67/26 |

OTHER PUBLICATIONS

Hristova et al., "Ad-me: Wireless Advertising Adapted to the User Location, Device and Emotions", 2004.*
Krejcar, "User localization for large artifacts prebuffering and safety possibilities in mobile embedded systems", 2008.*
Tso et al., "A framework for developing an agent-based collaborative service-support system in a manufacturing information network", 1998.*
Chinese language office action dated Dec. 3, 2015, issued in application No. TW 104124336.

* cited by examiner

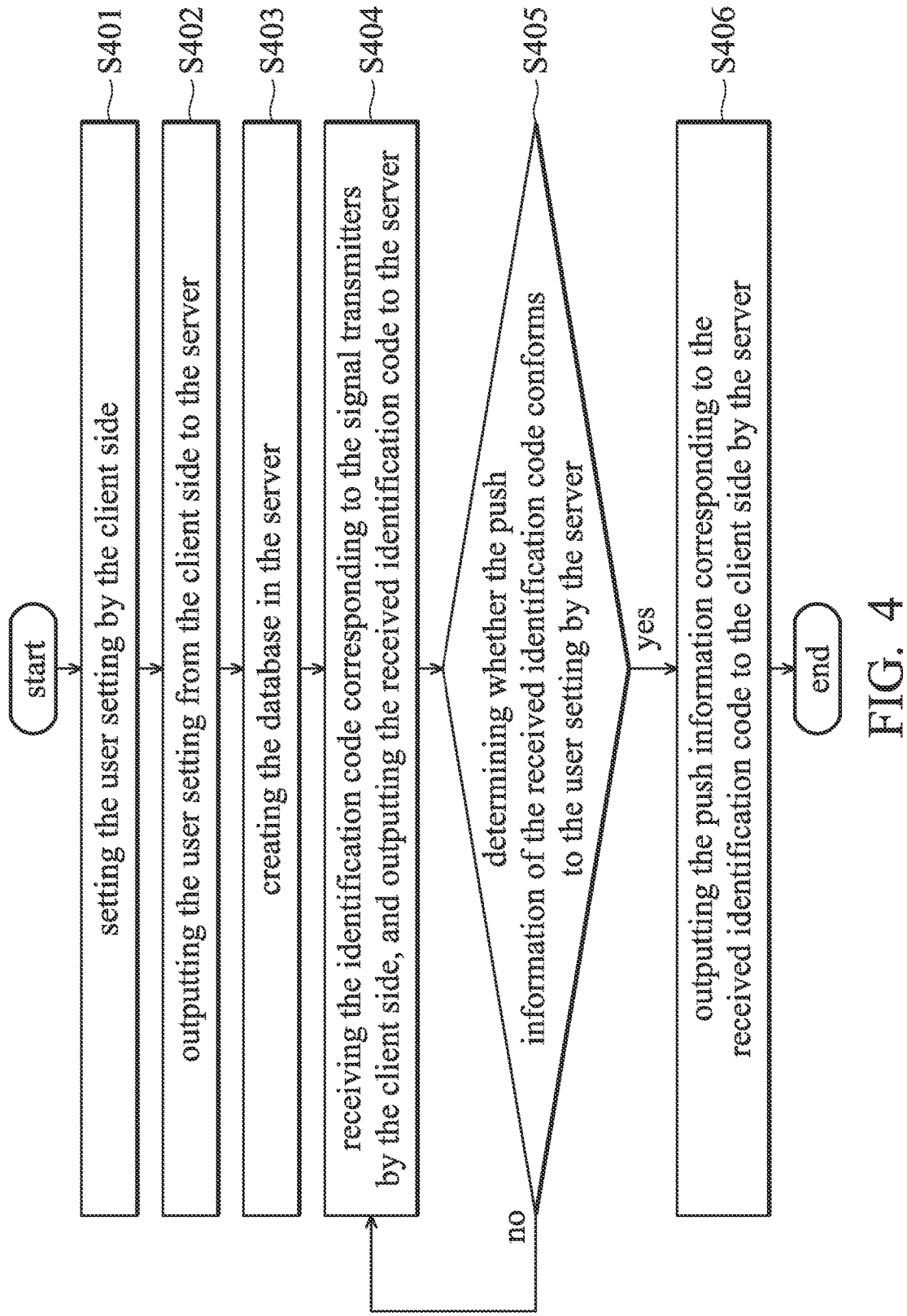

INFORMATION PUSH SYSTEM AND METHOD

CROSS REFERENCE TO RELATED APPLICATIONS

This application claims priority of Taiwan Patent Application No. 104124336, filed on Jul. 28, 2015, the entirety of which is incorporated by reference herein.

BACKGROUND OF THE INVENTION

Field of the Invention

The application relates in general to an information push system and an information push method, and in particular to an information push system and an information push method for filtering push information corresponding to a plurality of signal transmitters according to a user setting.

Description of the Related Art

These days, due to the rapid development of the Internet, a function for providing real-time information to users has been produced to meet user requirements. However, given the large amount of information available, unnecessary advertisements may cause problems for users if it means that they cannot effectively get the information that they need. Thus, how to effectively filter push information and send the push information to users is a problem which needs to be solved immediately.

BRIEF SUMMARY OF INVENTION

An embodiment of the present invention provides an information push system, including a plurality of signal transmitters, a client side, and a server. The signal transmitters are configured to output a respective identification code. The client side is configured to determine a user setting, and receive the identification codes from the signal transmitters. The server is configured to receive the user setting and the identification codes from the client side, and output the push information of a received identification code according to the user setting and the received identification code. The server also includes a database, which is configured to store the user setting, and the identification code and the push information which are corresponding to each signal transmitter.

Another embodiment of the present invention provides an information push method, including: determining a user setting at a client side; outputting the user setting from the client side to a server; creating a database in the server, which is configured to store the user setting, the identification code corresponding to a plurality of signal transmitters, and push information corresponding to each signal transmitter; filtering the push information by the server according to the user setting; receiving the identification code corresponding to the signal transmitters by the client side; outputting the received identification code from the client side to the server; and outputting the push information corresponding to the received identification code according to the user setting and the received identification code.

BRIEF DESCRIPTION OF DRAWINGS

The invention can be more fully understood by reading the subsequent detailed description and examples with references made to the accompanying drawings, wherein:

FIG. 4 is a flow chart of the information push method in accordance with an embodiment of the invention.

DETAILED DESCRIPTION OF INVENTION

Further areas to which the present systems and methods can be applied will become apparent from the detailed description provided herein. It should be understood that the detailed description and specific examples, while indicating exemplary embodiments of an information push system and an information push method, are intended for purposes of illustration only and are not intended to limit the scope of the invention.

Figure 1:
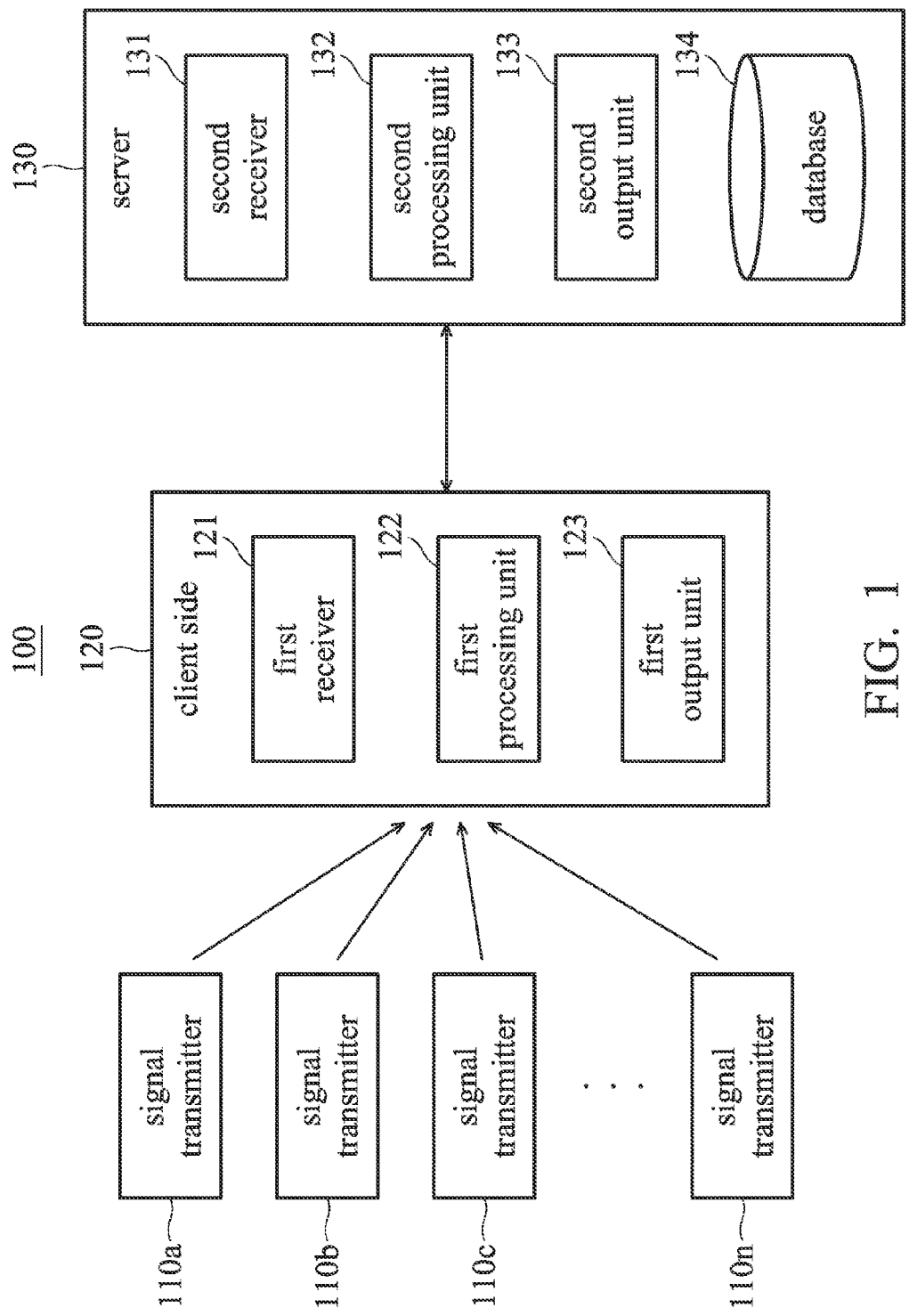
FIG. 1 is a block diagram of the information push system in accordance with an embodiment of the invention.

FIG. 1 is a block diagram of the information push system in accordance with an embodiment of the invention. As shown in FIG. 1, the information push system 100 includes a plurality of signal transmitters 110a-110n, a client side 120, and a server 130. The signal transmitter can be a Bluetooth transmitter or the device which transmits radio waves. The client side 120 can be a PDA, a mobile phone, a smartphone, a notebook, a tablet, or a game device which has a Bluetooth receiver, or a device which receives radio waves. The server 130 can be a server that connects to the client side 120, such as a cloud server which connects to the client side 120 through the Internet.

Each of the signal transmitters 110a-110n outputs an identification code by way of transmitting a radio wave. The identification code is composed of a plurality of parameters. The parameters are used to represent different information, such as the type or the quantity of the products. The server determines the output information according to the combination of the parameters after receiving the identification code. The client side 120 includes a first receiver 121, a first processing unit 122, and a first output unit 123. When the client side 120 enters the effective transmission-range of the signal transmitters 110a-110n, the first receiver 121 receives the identification code corresponding to the signal transmitters 110a-110n. The first processing unit 122 determines a user setting through a user interface. The first output unit 123 outputs the user setting and the received identification code to the server 130. The server 130 includes a second receiver 131, a second processing unit 132, a second output unit 133, and a database 134. The second receiver 131 receives the user setting and the identification code from the client side 120. The second processing unit 132 determines whether the push information corresponding to the received identification code conforms to the user setting. When the received identification code conforms to the user setting, the second output unit 133 outputs the push information corresponding to the received identification to the client side 120. Conversely, when the received identification code does not conform to the user setting, the second output unit 133 does not output the push information corresponding to the received identification to the client side 120. The database 134 can be a storage space of the cloud server or a memory of the electronic device which stores the user setting received from the client side 120, and the identification code and the push information which are corresponding to each signal transmitter.

Figure 2:
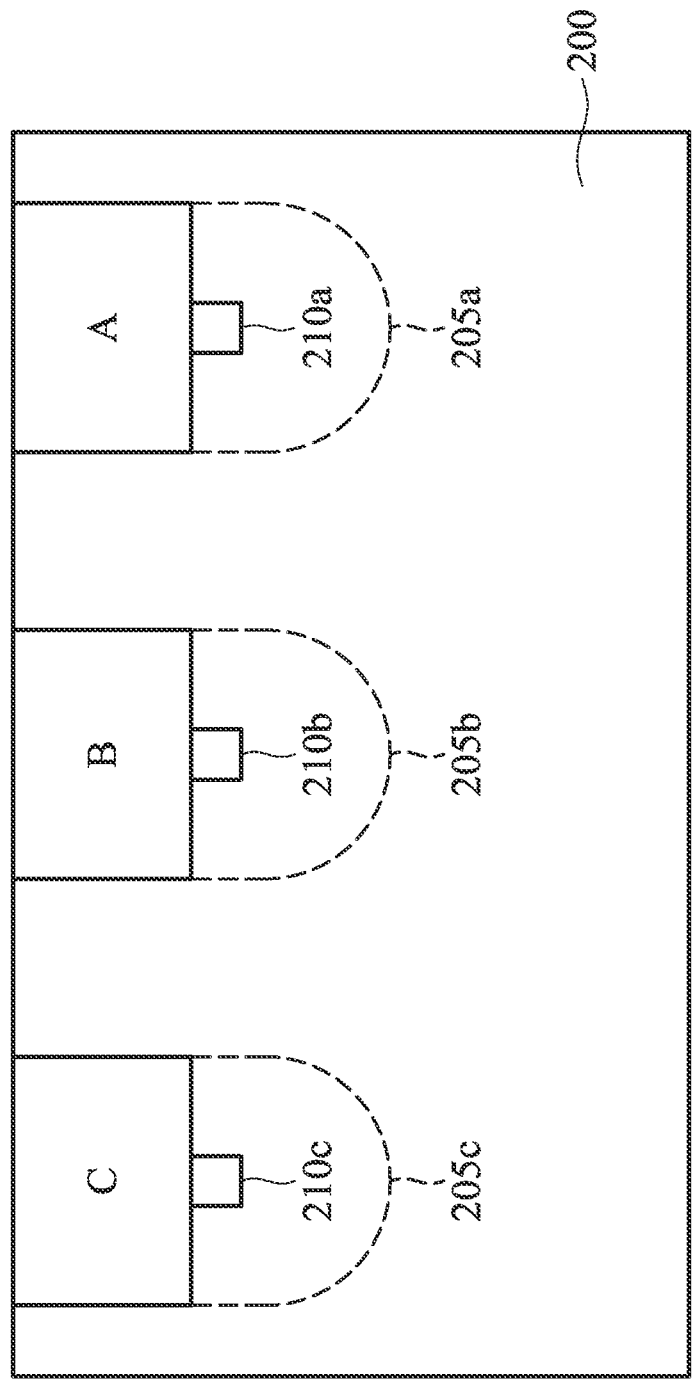
FIG. 2 is a schematic diagram of a configuration of a plurality of signal transmitters in accordance with an embodiment of the invention.

FIG. 2 is a schematic diagram of a configuration of a plurality of signal transmitters in accordance with an embodiment of the invention. In the embodiment, the signal transmitters 210a-210c are low-power Bluetooth transmitters. As shown in FIG. 2, the areas A-C in the market 200 respectively sell different products A-C. The identification code, product information and push information, such as the special offer, have already been stored in the database 134 of the server 130. Before the user enters the market 200, the user can set a shopping list which includes product A and product C through the user interface of the client side 120, and send the setting by the first output unit 123 through the Internet, LAN or other wireless transmission technology. When the user enables the Bluetooth receiver of the client side 120 and enters the effective transmission-range 205a of the signal transmitter 210a. The client side 120 receives the identification code corresponding to the signal transmitter 210a, and outputs the identification code to the server 130 by the first output unit 123. After the server 130 receives the identification code by the second receiver 131, the server 130 further determines whether the product A corresponding to the signal transmitter 210a is the product that the user wants to buy. In the embodiment, when the product A is the product that the user wants to buy, the server 130 outputs the push information, such as the special offer, from the second output unit 133 to the client side 120. The display unit (not shown) of the client side 120 displays the push information corresponding to the product A.

Conversely, when the client side 120 enters the effective transmission-range 205b of the signal transmitter 210b, because the second processing unit 132 of the server 130 determines that the product B corresponding to the signal transmitter 210b is not on the shopping list, the server 130 does not output the push information corresponding to the product B to the client side 120 for filtering the push information of the product that the users do not want to buy.

It should be noted that when the type and quantity of the product in the areas A-C are the same, the output identification code of the signal transmitters 210a-210c can be the same identification code which is composed by the same parameters. In other words, when the user enters the effective transmission-ranges 205a-205c of the signal transmitters 210a~210c, the push information received by the first receiver 121 of the client side 120 are the same.

Figure 3:
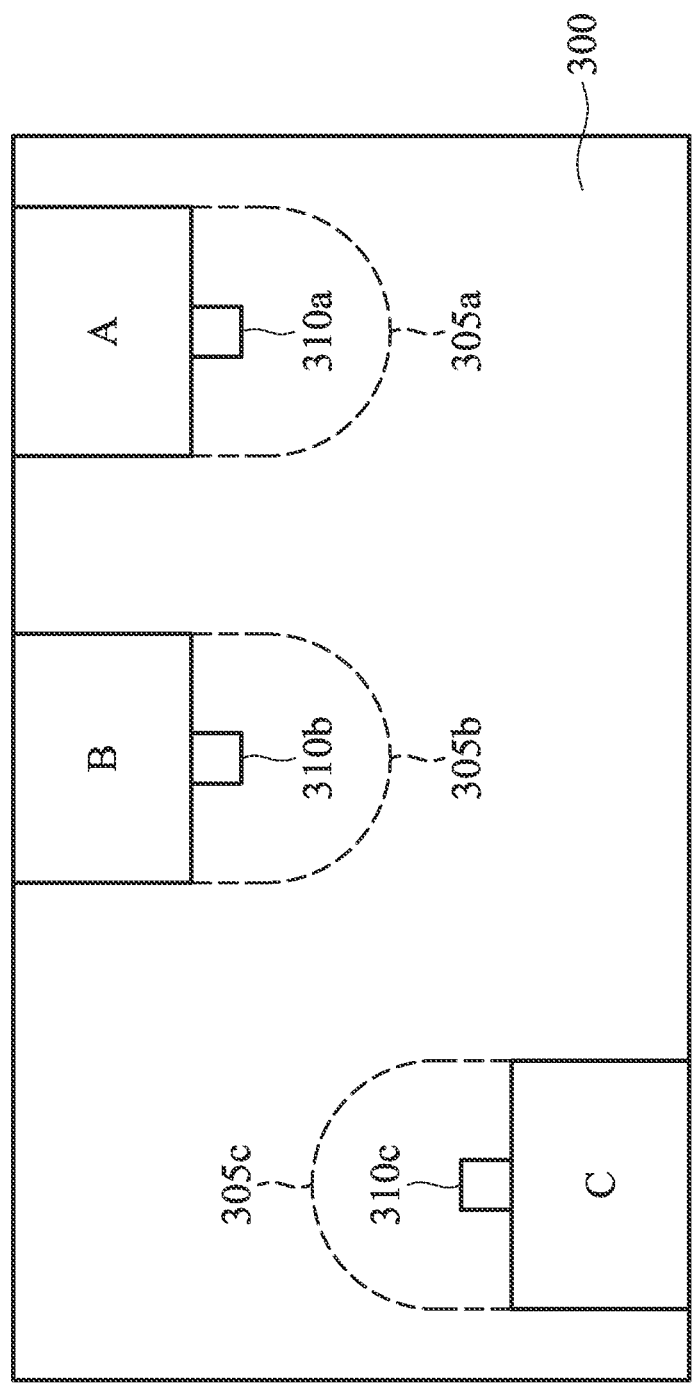
FIG. 3 is a schematic diagram of a configuration of a plurality of signal transmitters in accordance with another embodiment of the invention.

FIG. 3 is a schematic diagram of a configuration of a plurality of signal transmitters in accordance with another embodiment of the invention. According to another embodiment, the database 134 further stores the locations of the products and the product information. The server 130 provides path planning for picking up the products according to the weightings of the locations of the products and the product information. The information of the location includes the positions of the signal transmitters 310a-310c in the warehouse and the distance between each signal transmitter. The product information includes the information of the weight or the quantity of the products. Table 1 shows the location of the products A-C and the product information recited in FIG. 3.

TABLE 1

| | distance from product A | product weight |
|---|---|---|
| product B | 5 m | 1 kg |
| product C | 10 m | 3 kg |

As shown in FIG. 3, when the user wants to pick up product A, the second processing unit 132 of the server 130 obtains the location of the products B and C and the product information from the database 134 for planning the pickup path. In general, when the user wants to pick up the products, the product which is the nearest and the lightest is the first choice for the user. Thus, in the embodiment, the weighting of the distance between the products and the weighting of the product weight are both set to 0.5. And the second processing unit 132 calculates a score for determining the pickup order according to a formula, e.g. "score= (distance*the weighting of the distance)+(product weight*the weighting of the product weight". For example, according to the information recited in table 1, the score corresponding to the product B is "3", and the score corresponding to the product C is "6.5". When the score is higher, this means it is more inconvenient to pick up the product, e.g. the distance between the products is farther or the product weight is heavier. After the second processing unit 132 obtains the score corresponding to each product, the second processing unit 132 further determines the pickup order according to the high levels and low levels of the scores. In the embodiment, the pickup order is "product A→product B→product C." The server 130 outputs the path planning from the second output unit 133 to the client side 120 for displaying the map information on the display unit (not shown) of the client side 120.

In addition, when the client side 120 enters the effective transmission-ranges 305a-305c of the signal transmitters 310a-310c, the server 130 outputs a pop-up message according to the received identification code. For example, the display unit (not shown) of the client side 120 displays the pop-up message for the arrival and/or the pickup quantity. It should be noted that the parameters can be set according to the needs of the user, but they are not limited thereto.

According to another embodiment, the server 130 further includes a feedback module, which is configured to send the user setting back to the manager of the server 130. The manager is able to change or correct the location of each signal transmitter, the product information, or the push information.

Please refer to FIG. 4 with FIG. 1. FIG. 4 is a flow chart of the information push method in accordance with an embodiment of the invention. In step S401, the user setting is set by the client side 120, such as the shopping list or the pickup list. In step S402, the first output unit 123 of the client side 120 outputs the user setting to the server 130. In step S403, the database 134 is created in the server 130, which is configured to store the received user setting from the client side 120, the identification code corresponding to the signal transmitters 110a-110n, and the push information corresponding to each identification code. In step S404, when the client side 120 enters the effective transmission-range of the signal transmitters 110a-110n, the first receiver 121 of the client side 120 receives the identification code corresponding to the signal transmitters 110a-110n, and the first output unit 123 outputs the received identification code to the server 130. In step S405, when the second receiver 131 of the server 130 receives the output identification code from the client side 120, the second processing unit 132 determines whether the push information of the received identification code conforms to the user setting. When the second processing unit 132 determines that the push information conforms to the user setting, the method proceeds to step S406, the second output unit 133 of the server 130 outputs the push information corresponding to the received identification code to the client side 120. Otherwise, when the second processing unit 132 determines that the push information does not conform to the user setting, the method proceeds to step S404, and the first receiver 121 of the client side 120 receives the identification code corresponding to the signal transmitters 110a~110n once again.

As described above, an embodiment of the invention provides an information push system and an information push method allowing users to set a shopping list or a pickup list in advance for filtering unnecessary push information. Furthermore, users can further plan a shopping path or a pickup path by using the positioning function of the signal transmitters and the product information. That might improve the efficiency of shopping or the pickup, and also improve the user experience.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. An information push system, comprising:
   a plurality of signal transmitters, configured to respectively output an identification code;
   a client side, configured to determine a user setting, and receive the identification codes from the signal transmitters; and
   a server, configured to receive the user setting and the identification codes from the client side, and output push information corresponding to a received identification code according to the user setting and the received identification code;
   wherein the server further includes a database, configured to store the user setting, the identification code and the push information which are corresponding to each signal transmitter, and location and at least one parameter which are corresponding to each signal transmitter, the location corresponds to a first weight and the parameter corresponds to a second weight; and
   wherein the server further outputs path information to the client side according to the user setting, the first weight and the second weight, and outputs a pop-up message to the client side according to the path information and the received identification code.

2. The system as claimed in claim 1, wherein the server further determines whether the push information corresponding to the received identification code conforms to the user setting, and outputs the push information corresponding to the received identification code to the client side when the push information corresponding to the received identification code conforms to the user setting.

3. An information push method, comprising:
   determining a user setting at a client side;
   outputting the user setting from the client side to a server;
   creating a database in the server, where the database is configured to store the user setting, identification codes corresponding to a plurality of signal transmitters, push information corresponding to each signal transmitter, and location and at least one parameter which are corresponding to each signal transmitter, wherein the location corresponds to a first weight and the parameter corresponds to a second weight;
   filtering the push information by the server according to the user setting;
   receiving the identification code corresponding to the signal transmitters by the client side;
   outputting received identification code from the client side to the server;
   outputting the push information corresponding to the received identification code according to the user setting and the received identification code;
   outputting path information from the server to the client side according to the user setting, the first weight and the second weight; and
   outputting a pop-up message from the server to the client side according to the path information and the received identification code.

4. The method as claimed in claim 3, wherein the step for outputting the push information corresponding to the received identification code according to the user setting and the received identification code further comprises:
   determining whether the push information corresponding to the received identification code conforms to the user setting; and
   outputting the push information corresponding to the received identification code to the client side when the push information corresponding to the received identification code conforms to the user setting.

* * * * *